(12) United States Patent
Mizukami et al.

(10) Patent No.: US 8,552,601 B2
(45) Date of Patent: Oct. 8, 2013

(54) ELECTRIC MOTOR AND ELECTRICAL MACHINERY EQUIPPED THEREWITH

(75) Inventors: Hirofumi Mizukami, Osaka (JP); Akihiko Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 12/922,125

(22) PCT Filed: Mar. 12, 2009

(86) PCT No.: PCT/JP2009/001112
§ 371 (c)(1),
(2), (4) Date: Sep. 10, 2010

(87) PCT Pub. No.: WO2009/113311
PCT Pub. Date: Sep. 17, 2009

(65) Prior Publication Data
US 2011/0043071 A1 Feb. 24, 2011

(30) Foreign Application Priority Data
Mar. 13, 2008 (JP) ................. 2008-063685

(51) Int. Cl.
*H02K 1/04* (2006.01)
(52) U.S. Cl.
USPC .......... 310/43; 310/45; 310/216.124
(58) Field of Classification Search
USPC .......... 310/43, 216.12, 51, 156.08, 156.21, 310/156.23, 216.121, 216.124, 216.137, 310/45
See application file for complete search history.

(56) References Cited

U.S. PATENT DOCUMENTS

| 5,066,880 | A | * | 11/1991 | Banon | 310/156.55 |
| 5,157,297 | A | * | 10/1992 | Uchida | 310/156.61 |
| 5,200,662 | A | * | 4/1993 | Tagami et al. | 310/156.61 |
| 5,704,111 | A | * | 1/1998 | Johnson et al. | 29/598 |
| 5,986,374 | A | * | 11/1999 | Kawakami | 310/156.13 |
| 6,069,421 | A | * | 5/2000 | Smith et al. | 310/43 |
| 6,121,709 | A | * | 9/2000 | Fathimulla et al. | 310/216.065 |
| 7,896,626 | B2 | * | 3/2011 | Shibuya I et al. | 417/423.7 |
| 2002/0117926 | A1 | | 8/2002 | Joong et al. | |
| 2002/0153783 | A1 | | 10/2002 | Lau | |

(Continued)

FOREIGN PATENT DOCUMENTS

JP 56-103938 A 9/1981
JP 61-049570 U 4/1986

(Continued)

OTHER PUBLICATIONS

International Search Report for International Application No. PCT/JP2009/001112, dated Jun. 16, 2009, 2 pages.

(Continued)

*Primary Examiner* — Dang Le
(74) *Attorney, Agent, or Firm* — Brinks Hofer Gilson & Lione

(57) ABSTRACT

An electric motor includes a stator including stator steel core (11) around which a coil is wound; a rotor which includes rotating body (30) that holds a plurality of permanent magnets (32) in the circumferential direction to face the stator, and shaft (16) that fastens rotating body (30) so as to penetrate the center of rotating body (30); a bearing (15) for supporting shaft (16); and bracket (17) for fixing bearing (15), wherein dielectric layer (50) is provided between shaft (16) and the outer periphery of rotating body (30).

15 Claims, 12 Drawing Sheets

(56) References Cited

U.S. PATENT DOCUMENTS

| | | | |
|---|---|---|---|
| 2005/0253480 A1* | 11/2005 | Pizzichil | 310/261 |
| 2005/0285464 A1* | 12/2005 | Orders et al. | 310/88 |
| 2006/0033402 A1 | 2/2006 | Kim et al. | |
| 2006/0220474 A1* | 10/2006 | Yoshida | 310/43 |
| 2007/0290570 A1 | 12/2007 | Okada et al. | |

FOREIGN PATENT DOCUMENTS

| | | |
|---|---|---|
| JP | 06-086485 A | 3/1994 |
| JP | 06-261507 A | 9/1994 |
| JP | 08-237895 A | 9/1996 |
| JP | 11-178294 A | 7/1999 |
| JP | 2001-119876 A | 4/2001 |
| JP | 2001-268831 A | 9/2001 |
| JP | 2001-320844 A | 11/2001 |
| JP | 2002-174228 A | 6/2002 |
| JP | 2002-262488 A | 9/2002 |
| JP | 2003-113842 A | 4/2003 |
| JP | 2005-198374 A | 7/2005 |
| JP | 2006-187144 A | 7/2006 |
| JP | 2007-159302 A | 6/2007 |
| JP | 2007-166813 A | 6/2007 |

OTHER PUBLICATIONS

Extended European Search Report for European Application No. 09720968.8, dated Aug. 1, 2012, 9 pages.

* cited by examiner

ELECTRIC MOTOR AND ELECTRICAL MACHINERY EQUIPPED THEREWITH

This application is a 371 application of PCT/2209/001112 having an international filing date of Mar. 12, 2009, which claims priority to JP2008-063685 filed on Mar. 13, 2008, the entire contents of which are incorporated herein by reference.

TECHNICAL FIELD

The present invention relates to an electric motor, particularly, an electric motor which is improved so as to prevent the occurrence of electrolytic corrosion of a bearing.

BACKGROUND ART

Recently, an electric motors often adopt a type of drive by an inverter of a pulse width modulation type (hereinafter, referred to as PWM type). In the case of the inverter driving of the PWM type, since the neutral point potential of a coil does not become zero, the potential difference (hereinafter, referred to as the axial voltage) is generated between the outer ring and the inner ring of a bearing. The axial voltage includes a high frequency component by the switching. Thus, when the axial voltage reaches the insulating breakdown voltage of an oil film in the bearing, the minute current flows in the bearing, whereby the electrolytic corrosion is generated in the bearing. In a case where the electrolytic corrosion proceeds, a wave-shaped abrasion phenomenon is generated in the bearing inner ring or the bearing outer ring or the bearing ball and may lead to an abnormal sound, which becomes one main cause of defects in the electric motor.

In the related art, in order to prevent the electrolytic corrosion, the following measures are considered.

(1) to put the bearing inner ring and the bearing outer ring in a conduction state.

(2) to put the bearing inner ring and the bearing outer ring in a insulating state.

(3) to reduce the axial voltage.

As a specific method of (1), a lubricant for the bearing can be conductive. The conductive lubricant has a problem in that the conductivity deteriorates as time goes on or the sliding reliability is insufficient. Moreover, a method of installing a brush on the rotation axis, making the conduction state can also be considered, but this method also has a problem such as a brush abrasion powder or a need for a space.

As a specific method of (2), changing a steel ball in the bearing to a ceramic ball can be included. This method has a very high electrolytic corrosion prevention effect, but has a problem of high costs; therefore it cannot be adopted in a general-purpose electric motor.

As a specific method of (3), a method of reducing the axial voltage by short-circuiting a stator steel core and a bracket to change the electrostatic capacity is well known in the related art (for example, see Patent Citation 1).

Impedance when the electrostatic capacity and the resistance are connected with each other in parallel is indicated by the relation expression of $Z=1/j\omega C+R$. Herein, Z refers to impedance, j refers to an imaginary number, $\omega$ is a angular frequency, C refers an electrostatic capacity, and R refers to a resistance. As is apparent from the expression, if the electrostatic capacity rises or the resistance drops, the impedance drops. On the contrary, if the electrostatic capacity drops and the resistance rises, the impedance rises.

In Patent Citation 1, the impedance of the stator side is reduced by short circuiting the stator steel core and the bracket, whereby the electrolytic corrosion of the bearing is prevented.

That is, generally, in an electric motor, which is used in places where water is used such as washing machines and a dish washing and drying machine and which has a fear of an electric shock, it is necessary to add an separate insulation (hereinafter, referred to an additional insulation) in addition to the insulation of a charge portion (hereinafter, referred to as basic insulation). On the other hand, except for those situations, since electric motors used in indoor air conditioners, outdoor air conditioners, water heaters, air cleaners or the like do not have a fear of electric shock, the additional insulation is unnecessary. Thus, since the electric motors used in the indoor air conditioners, outdoor air conditioners, water heaters, air cleaners or the like do not have the rotor of the insulation configuration, the impedance of the rotor side (the bearing inner ring side) is in a low state. On the contrary, since the stator side (the bearing outer ring side) has the insulation configuration, the impedance is in a high state. In this case, since the potential of the bearing inner ring side is high, while the potential of the bearing outer ring side is low, there is an unbalance state, whereby the high axial voltage is generated. In addition, there was a possibility in which the electrolytic corrosion could be generated in the bearing due to the high axial voltage.

In order to avoid this state, Patent Citation 1 adopts a method of lowering the impedance of the stator side (the bearing outer ring side) as described above by short circuiting the stator steel core and the bracket, thereby approximating the impedance of the rotor side (the bearing inner ring side).

However, the method of the related art like Patent Citation 1 had the following problems. That is, since the method of the related art is a method of short-circuit, adjustment of the impedance is impossible, and the axial voltage rises depending on the material or the structure of the magnet of the rotor. Furthermore, as another problem, as a method of lowering the impedance, a state in which balance is maintained between the bearing inner ring and the bearing outer ring with the high potential can be included. In the case of this condition, a case where, if the balance of the impedance collapses due to the usage circumstances of the electric motor, an imbalance of the assembly accuracy of the stator and the rotor, or the like, and conversely, the axial voltage rises and the electrolytic corrosion is easily generated, was also considered as the possibility.

As described above, according to the electric motor of the present invention, the impedance of the rotor side (the bearing inner ring side) is raised to approximate the impedance of the stator side (the bearing outer ring side), whereby it is possible to hold the balance of the high frequency potential of the bearing inner ring side and the bearing outer ring side. Thus it is possible to provide an electric motor which prevents the occurrence of electrolytic corrosion in the bearing and electric machinery equipped therewith.

[Patent Citation 1]: Japanese Patent Unexamined Publication No. 2007-159302

SUMMARY OF THE INVENTION

The electric motor of the present invention includes a stator including a stator steel core around which a coil is wound; a rotor which includes a rotating body that holds a plurality of permanent magnets in the circumferential direction to face the stator and a shaft that fastens the rotating body so as to penetrate the center of the rotating body; a bearing for supporting the shaft; and a bracket for fixing the bearing, and has a configuration in which an dielectric layer is provided between the shaft and an outer periphery of the rotating body.

Furthermore, the dielectric layer is an insulating material for preventing the electrolytic corrosion.

With this configuration, through the dielectric layer provided between the shaft and the outer periphery of the rotating body, there is provided a configuration in which the electrostatic capacity by the dielectric layer is equivalently connected in series in the low impedance rotor, and therefore the configuration makes it possible to raise the impedance of the rotor side. In this manner, if the impedance of the rotor side is raised, it can approximate the high impedance of the stator side. As a result, it is possible to hold the balance so that the high frequency potentials of the bearing inner ring side and the bearing outer ring side are identical to each other. In this manner, it is possible to reduce the potential difference between the inner ring and the outer ring. For this reason, it is possible to prevent the occurrence of the electrolytic corrosion bearing generated by high frequency due to PMW or the like. Moreover, by changing the width or the material of the dielectric layer, the electrostatic capacity can be changed. As a result, it is also possible to optimally set the impedance of the rotor side. Furthermore, the dielectric layer refers to a layer which intentionally changes the permittivity and the thickness of the dielectric or the surface area of the conductive material (electrode) abutting the dielectric, and intends to interpose a dielectric element between the shaft and the rotating body.

Furthermore, in the electric motor of the present invention, the dielectric layer is an insulating resin, for example, syndiotactic polystyrene resin.

By using a syndiotactic polystyrene (hereinafter, referred to as SPS) resin in the insulating resin, the permittivity can be lowered. As a result, even if the thickness of the insulating resin is small, the impedance of the rotor side can be further raised.

The electric motor of the present invention has a configuration in which the dielectric layer is provided between the shaft and the rotating body so as to surround the shaft.

The electric motor of the present invention may have a configuration in which the dielectric layer is provided between the inner periphery side and the outer periphery side of the rotating body so as to surround the shaft.

The electric motor of the present invention may have a configuration in which the rotating body has an outer steel core constituting an outer periphery portion, an inner steel core constituting an inner periphery portion fastened to the shaft, and the dielectric layer, and the outer steel core and the inner steel core are fixed via the dielectric layer.

With this configuration, the structure of the rotating body can be easily produced, so that the productivity of the rotor can be improved.

The electric motor of the present invention may be arranged so that the dielectric layer insulates and separates the inner side from the outer side.

In the electric motor of the present invention, the dielectric layer may include a hole portion.

In this manner, by forming an air layer or hole as the hole portion in a part of the dielectric layer, the permittivity can be reduced, which makes possible to further raise the impedance of the rotor side.

Furthermore, in the electric motor of the present invention, the dielectric layer may have a shape in which a plurality of types of arcs with different radial direction widths is combined.

Moreover, the electric motor of the present invention has a configuration in which the rotor is arranged rotatably in the inner periphery side of the stator.

Furthermore, the electric motor of the present invention provides the dielectric layer so that the impedance between the stator steel core and the shaft rises, thereby setting the potential difference between the outer ring and the inner ring of the bearing when being driven to 10 V or less. Moreover, the electric motor of the present invention sets the impedance between a power supply lead line and the shaft to 400 kΩ or more, or 520 kΩ or more.

Furthermore, the electric machinery of the present invention is loaded with the above-mentioned electric motor.

DETAILED DESCRIPTION OF PREFERRED EMBODIMENTS

Hereinafter, an electric motor and electric machinery equipped therewith of the present invention will be described using the drawings.

First Exemplary Embodiment

Figure 1:
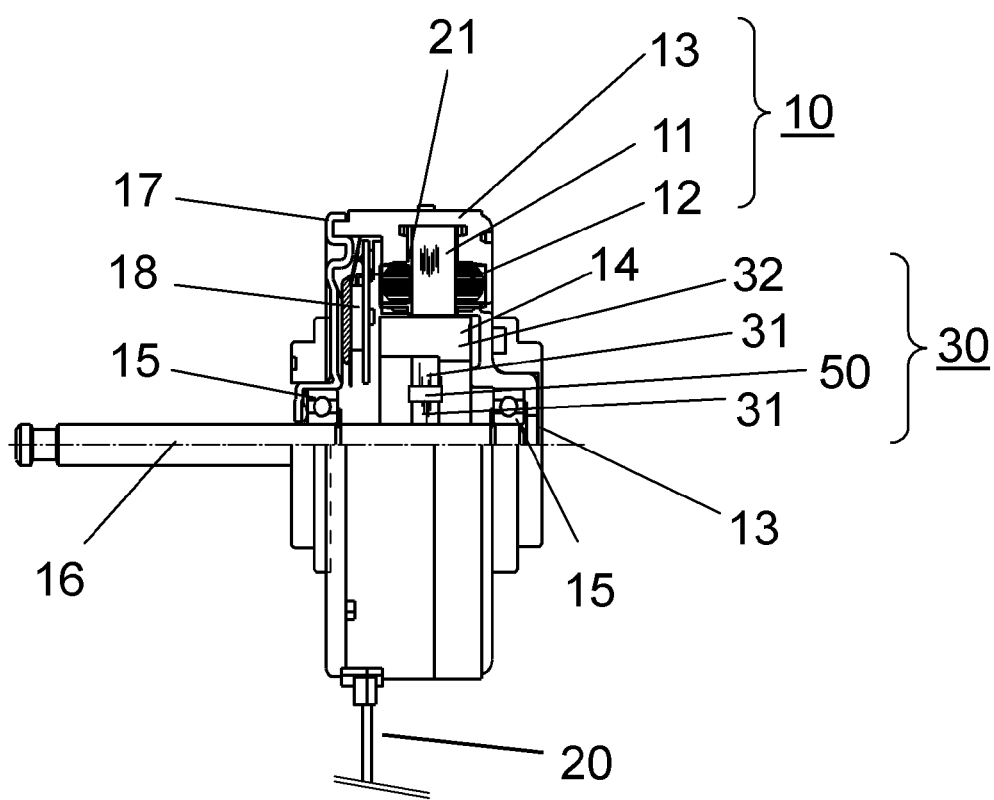
FIG. 1 is a configuration diagram showing a section of a brushless motor in a first embodiment in the present invention.

FIG. 1 is a configuration diagram showing a section of an electric motor in a first embodiment. In the present embodiment, a description will be given of an example of an electric motor which is loaded in an air conditioner as electric machinery and is a brushless motor for driving a blast fan. Furthermore, in the present embodiment, an example of an inner rotor type of an electric motor in which a rotor is rotatably disposed in an inner periphery side of a stator.

In FIG. 1, stator 10 is configured by molding stator steel core 11 around which stator coil 12 is wounded, with insulating resin 13 that is a mold material for integral molding. Furthermore, between stator steel core 11 and stator coil 12, resin 21 as an insulator for insulating stator steel core 11 is disposed.

Rotor 14 is inserted into an inner side of stator 10 via a gap. Stator 14 has disc-shaped rotating body 30 including rotor steel core 31, and shaft 16 which fastens rotating body 30 so as to penetrate the center of rotating body 30. Rotor steel core 31 maintains a plurality of permanent magnets in the circumferential direction to face the inner periphery side of stator 10. FIG. 1 shows a configuration example in which rotor steel core 31 is formed integrally with ferrite resin magnet 32 which is a permanent magnet. In this manner, the inner periphery side of stator 10 is arranged so as to face the outer periphery side of rotating body 30.

Two bearings 15 for supporting shaft 16 are mounted on shaft 16 of rotor 14. Bearings 15 are bearings having a plurality of steel balls. One of two bearings 15 is fixed to insulating resin 13 for integrally molding, and the other is fixed to metallic bracket 17. By the configuration described above, shaft 16 is supported by two bearings 15, so that rotor 14 freely rotates.

In addition, the brushless motor is equipped with print substrate 18 with a drive circuit installed thereon. After print substrate 18 is equipped, by pressing bracket 17 into stator 10, the brushless motor is formed. A lead line for applying the power supply voltage of the coil, a power supply voltage and a control voltage of a control circuit, and ground line 20 of the control circuit are connected to print substrate 18.

In addition, in the present embodiment, it is characterized in that dielectric layer 50 is provided in rotating body 30 becoming a portion between shaft 16 and the outer periphery of rotating body 30.

Figure 2:
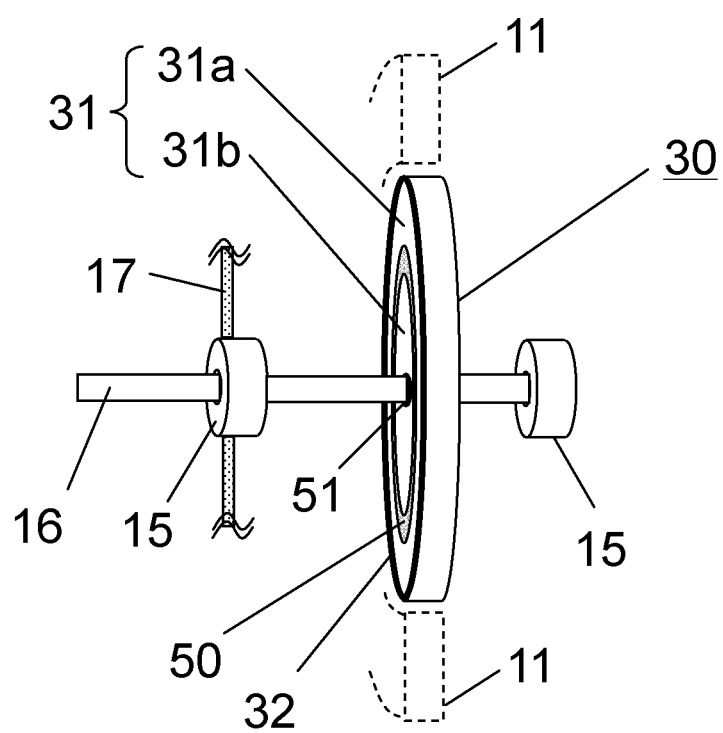
FIG. 2 is a diagram that schematically shows principal parts of the motor.

FIG. 2 is a diagram that schematically shows the principal portions of the brushless motor shown in FIG. 1. As shown in FIG. 2, ferrite resin magnet 32 is disposed in the outermost periphery of rotating body 30, and outer steel core 31a constituting rotor steel core 31, dielectric layer 50, inner steel core 31b constituting rotor steel core 31 are sequentially disposed toward the inner periphery side. Furthermore, dielectric layer 50 is a layer formed of the insulating resin. In the present embodiment, this dielectric layer 50 is provided for preventing the electrolytic corrosion. FIG. 2 shows an example in which dielectric layer 50 is formed in the ring shape so as to be rotated around shaft 16 between the inner periphery side and the outer periphery side of rotating body 30. In this manner, rotating body 30 has a configuration in which ferrite resin magnet 32, outer steel core 31a, the insulating resin forming dielectric layer 50, and inner steel core 31b are integrally formed. Furthermore, in fastening portion 51 of the inner periphery of inner steel core 31b, rotating body 30 is fastened to shaft 16. As a result, rotor 14 supported by bearing 15 is constituted.

In rotor body 30, dielectric layer 50 is a layer formed by the insulating resin which is the insulating material, and insulates and separates outer steel cores 31a from inner steel core 31b in series. On the other hand, dielectric layer 50 is formed by the insulating resin having a predetermined permittivity, whereby high frequency current can flow between outer steel core 31a and inner steel core 31b.

However, in a case where dielectric layer 50 is not provided, as described above, the impedance between the brackets based on the stator steel core is high, and, on the other hand, the impedance between the shafts which are electrically connected to the rotating body, is low. With respect to an equivalent circuit having this impedance component, high frequency current or the like of the pulse width modulation generated in the stator steel core or the like flows in. For this reason, between the outer ring of the bearing which is electrically connected to the bracket, and the shaft of the inner ring of the bearing, the potential difference due to the high frequency current is generated.

In the present embodiment, by providing dielectric layer 50 as shown in FIG. 2 in rotating body 30 of rotor 14 with low impedance, the impedance of rotor 14 is raised so as to approximate the impedance of bracket 17 side. That is, by providing dielectric layer 50 between outer steel core 31a and inner steel core 31b, rotor 14 becomes a configuration in which the electrostatic capacity by dielectric layer 50 is equivalently connected in series, whereby the impedance of rotor 14 can be raised. That is, by raising the impedance of rotor 14, the voltage drop of the high frequency flowing from rotor 14 to shaft 16 becomes larger. In addition, as a result, it is possible to lower the potential generated in shaft 16 by the high frequency current. Based on this principle, the brushless motor of the present invention reduces the potential difference due to the high frequency current between the outer ring of bearing 15 which is electrically connected to bracket 17, and shaft 16 of the inner ring side of bearing 15. For this reason, the portion between the bearing inner ring and the bearing outer ring is in the state in which the balance is maintained so that the potential difference is decreased in a state of generally low potential, whereby the occurrence of electrolytic corrosion is prevented in the bearing.

Furthermore, by changing the width or the material of dielectric layer 50, the electrostatic capacity can be changed, so that the impedance of rotor 14 side can be optimally set. That is, by enlarging the thickness (a distance between the electrodes) of the insulating resin which lowers the permittivity of the insulating resin forming dielectric layer 50, or by reducing the electrode area or the like, the electrostatic capacity by dielectric layer 50 can be lowered. In addition, in this manner, by reducing the electrostatic capacity by dielectric layer 50, the impedance of rotor 14 can be raised.

Furthermore, by using a syndiotactic polystyrene (hereinafter, referred to as SPS) resin as the insulating resin forming dielectric layer 50, the permittivity can be lowered. As a result, even if the thickness of the insulating resin is small, the impedance of rotor 14 can be further raised. That is, the resin generally used as the insulating resin of the electric motor is a resin in which an inorganic filler such as glass fiber reinforces poly butylene terephthalate (hereinafter, referred to as PBT) resin, polyethylene terephthalate (hereinafter, referred to as PET) resin or the like, and the material has a permittivity of about 3.5. On the contrary, the permittivity of the SPS resin is 2.6 in an unreinforced product and 2.8 in a reinforced product, and is lower than the general resin. Thus, the upper limit of the thickness of the insulating resin is restricted in structure, and in a case where the impedance is low and insufficient in the PBT resin or the like, it is possible to reduce the electrostatic capacity by using the SPS resin.

In addition, as shown in FIG. 2, by the configuration of rotating body 30 in which dielectric layer 50 is separated into outer steel core 31a and inner steel core 31b, it is possible to integrally mold the rotor steel core and the insulating resin without shaft 16 in the production process. For this reason, as compared to a configuration in which the dielectric layer is provided between the shaft and the rotor steel core, in the configuration as shown in FIG. 2 rotating body 30 can be molded without the shaft, which can raise productivity. Furthermore, in the configuration as shown in FIG. 2, even if the kind of shaft 16 is changed, shaft 16 can be fixed by the caulking or pressing shaft 16, so that it is easy to correspond to revision of items, which also can improve the productivity.

Figure 3:
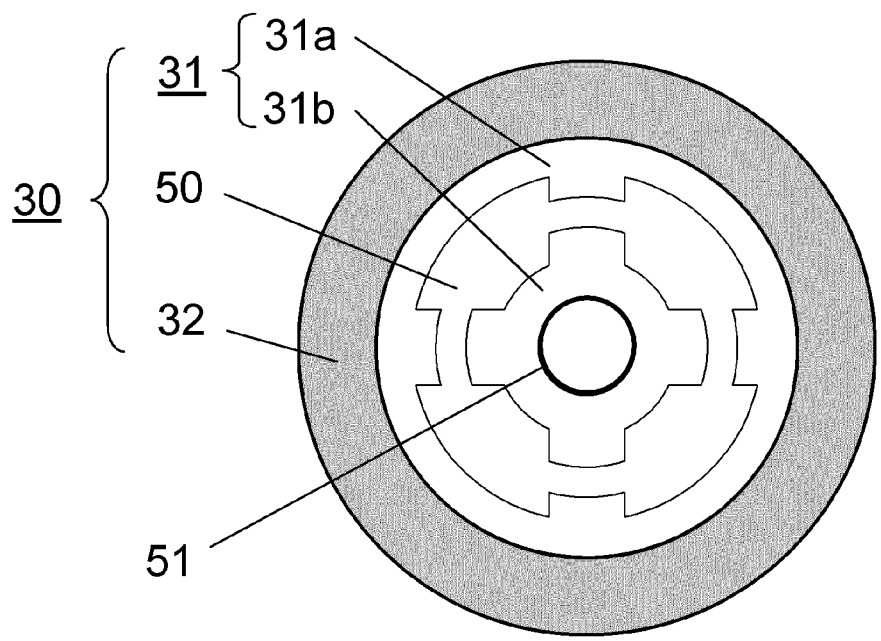
FIG. 3 is a diagram showing a specific configuration example of a rotating body of the motor.
Figure 4:
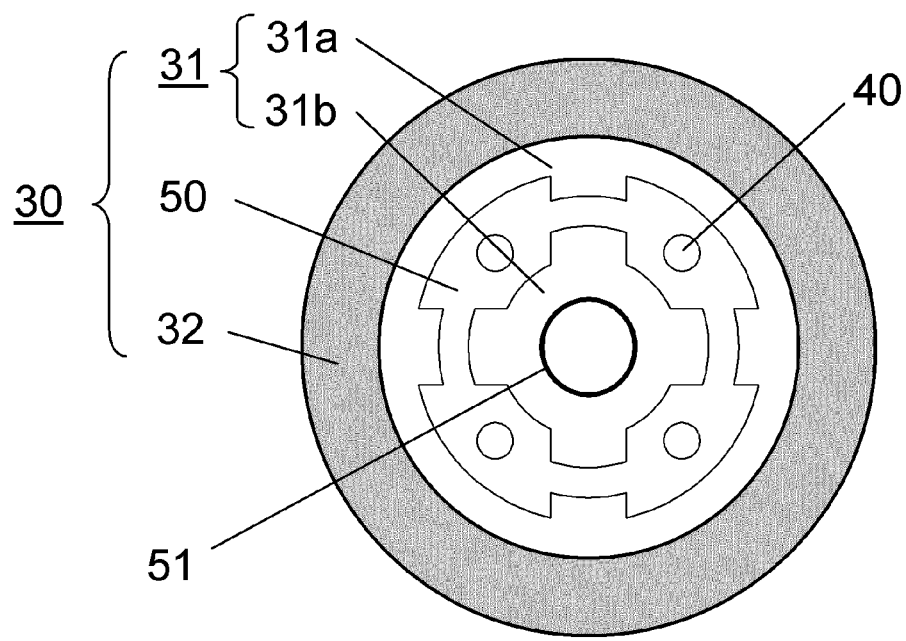
FIG. 4 is a diagram showing specific another configuration example of the rotating body of the motor.

FIGS. 3 and 4 are drawings showing the specific configuration examples of the rotating body of the brushless motor in the embodiment of the present invention. FIGS. 3 and 4 show configuration examples in which the rotating body is seen from the top thereof. The rotating body shown in FIGS. 3 and 4 has dielectric layer 50 of the shape in which a plurality types of arcs with different radial widths in the diameter direction is radially combined between outer steel core 31a and inner steel core 31b in the diameter direction. That is, dielectric layer 50 has a shape in which a convex protrusion shape and a concave protrusion shape repeatedly rotate in at least one of the outer periphery side and the inner periphery side. Furthermore, outer steel core 31a and inner steel core 31b are fitted into dielectric layer 50 of this shape.

As shown in FIG. 2, in a case where dielectric layer 50 is a complete ring shape, there is a fear of slipping or the like at the time of rotation. On the contrary to this, by the shape of dielectric layer 50 as shown in FIGS. 3 and 4, a configuration, in which a protrusion for preventing slipping is inserted between dielectric layer 50 and the steel core, is obtained, whereby slipping can be prevented and the rotation strength can be raised. In a more specific example, the respective protrusions are provided on outer steel core 31a and inner steel core 31b, respectively so that the protrusions for preventing slipping is disposed in a position where they face each other.

Furthermore, the rotating body shown in FIG. 4 shows a configuration example in which dielectric layer 50 includes the hole portion, which is gap 40 such as an air layer or a hole, in a partial area thereof. The rotating body shown in FIG. 4 provides gap 40 in the thick portion so that a decline in maintenance strength of outer steel cores 31a and inner steel core 31b does not increase due to the influence of gap 40. Furthermore, gaps 40 of the equivalent or the identical shape are provided at four places so that unbalancing does not increase during rotation. However, since the permittivity of the air is about 1, it is very small compared to the insulating resin. Thus, in a case where the upper limit of the thickness of the insulating resin is restricted in structure, whereby the impedance of the rotor side (the bearing inner ring side) is low and the axial voltage is high even when the SPS resin is used, or in a case where the used amount of the insulating resin is large and the cost is high, it is possible to lower the electrostatic capacity by forming the air layer or the hole in a part of the insulating resin, whereby the impedance of the rotor side (the bearing inner side) can be further raised.

Figure 5:
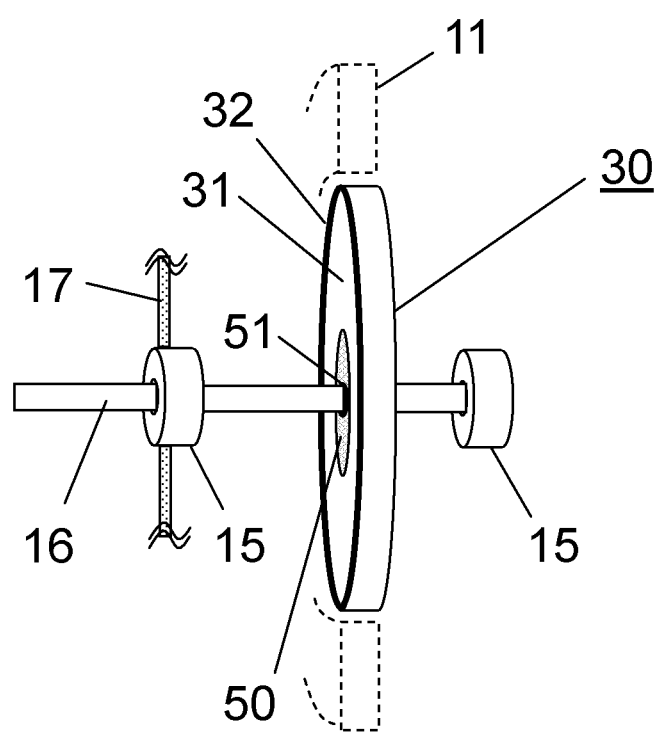
FIG. 5 is a diagram showing another configuration example of a rotor of the motor.

FIG. 5 is a diagram showing another configuration example of the rotor of the brushless motor in the embodiment of the present invention.

In rotating body 30 shown in FIG. 5, ferrite resin magnet 32 is disposed at the outermost periphery portion, and rotor steel core 31, and dielectric layer 50 formed of the insulating resin are sequentially disposed toward the inner periphery side. As described above, rotating body 30 shown in FIG. 5 has a configuration in which ferrite resin magnet 32, rotor steel core 31, and the insulating resin forming dielectric layer 50 are integrally formed. Furthermore, in fastening portion 51 of the inner periphery of dielectric layer 50, rotating body 30 is fastened to shaft 16. That is, rotating body 30 is fastened to shaft 16 via dielectric layer 50. Rotor 14 may have this configuration, or may have a configuration in which the electrostatic capacity by dielectric layer 50 is connected in series between rotor steel core 31 and shaft 16, whereby the impedance of rotor 14 can be raised.

Hereinafter, the present invention will be specifically described using the embodiment. In addition, the present invention is not limited to the following embodiment, and unless the gist of the present invention is changed, the present invention is not limited by the embodiment.

First Example

Figure 6:
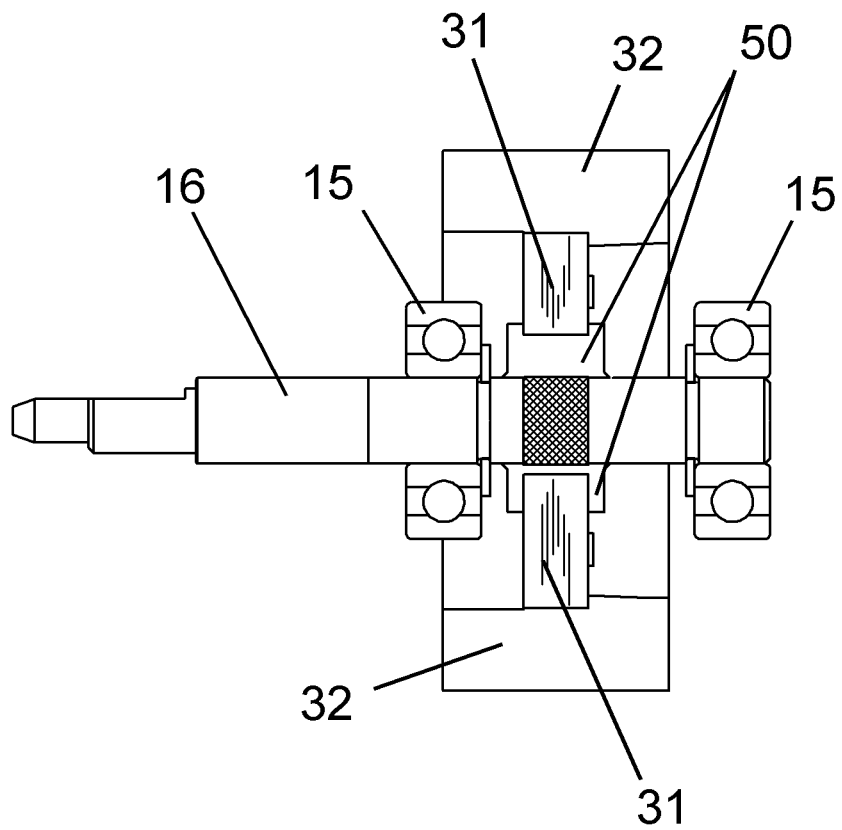
FIG. 6 is a diagram showing a section of the rotor of the brushless motor used in the first embodiment.

FIG. 6 is a diagram showing a sectional surface of the rotor of the brushless motor used in the first embodiment. As shown in FIG. 6, the portion between rotor steel core 31 and shaft 16 is insulated by dielectric layer 50.

By changing the inner diameter of rotor steel core 31, the axial voltage when changing the thickness of the insulating resin forming dielectric layer 50 was measured. The insulating resin material was implemented by two types of the PBT resin having the permittivity of 3.6 and the SPS resin having the permittivity of 2.8. Furthermore, the measurement was performed in a manner in which the same stator is used and the respective rotors are exchanged. As the bearing, Minebea 608 (lubricant of 239 is used) was used.

Figure 7:
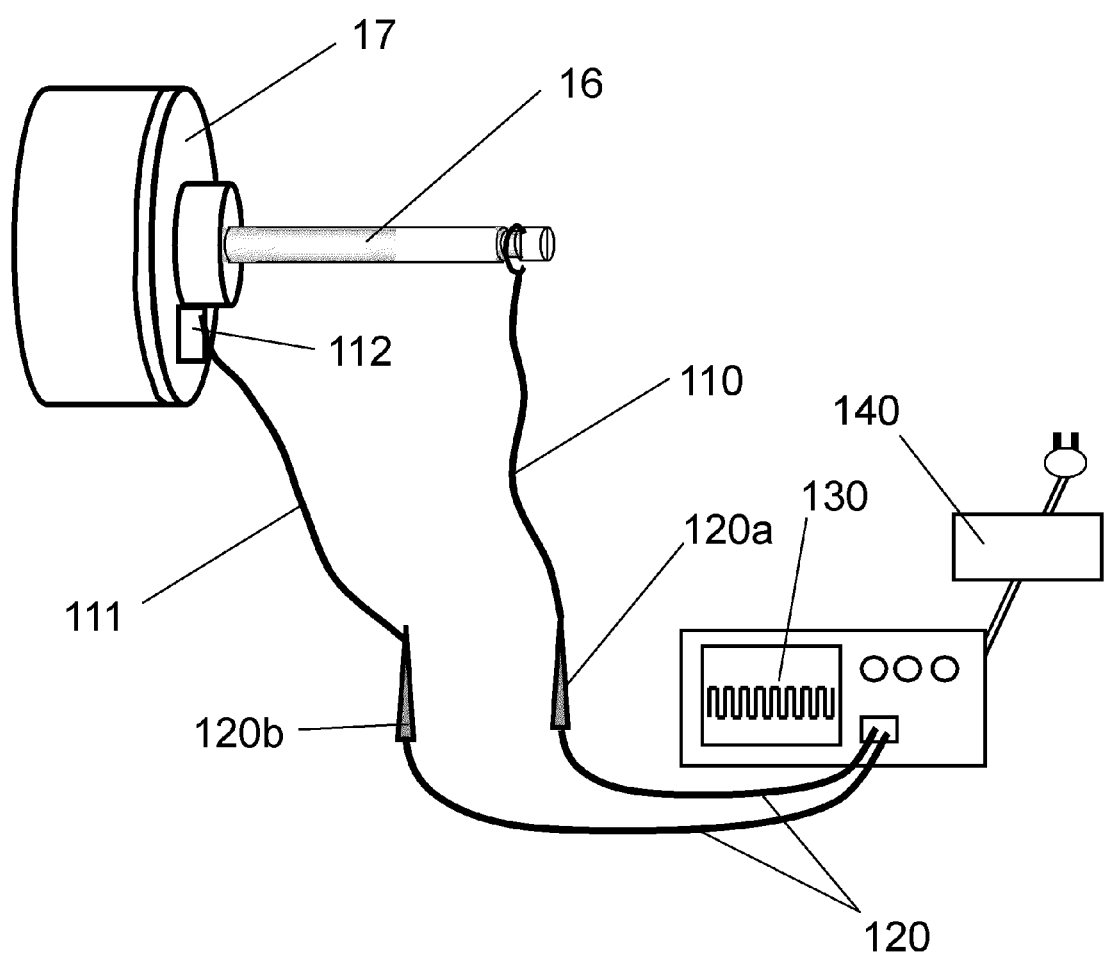
FIG. 7 is a diagram showing a measurement method of an axial voltage of the first embodiment.

FIG. 7 is a diagram showing the measurement method of the axial voltage of the first embodiment. When measuring the axial voltage, a stabilized DC power supply was used, the power supply voltage Vdc of the coil was 391 V, and the power supply voltage Vcc of the control circuit was 15 V, and the measurement was performed under the same driving condition of rpm 1000 r/min. In addition, the rpm was regulated by the control voltage Vsp, and the brushless motor orientation during operation was a shaft horizontal.

The measurement of the axial voltage was performed so that a voltage wave form was observed by digital oscilloscope 130 (Techtronics DPO7104) and high voltage differential probe 120 (Techtronics P5205), it was confirmed whether or not wave form collapse was generated, and the measurement voltage from peak to peak was set to the axial voltage.

Furthermore, the wave form collapse of the axial voltage was classified into three types: a complete wave form collapse, a partial wave form collapse, and no wave form collapse.

Figure 8:
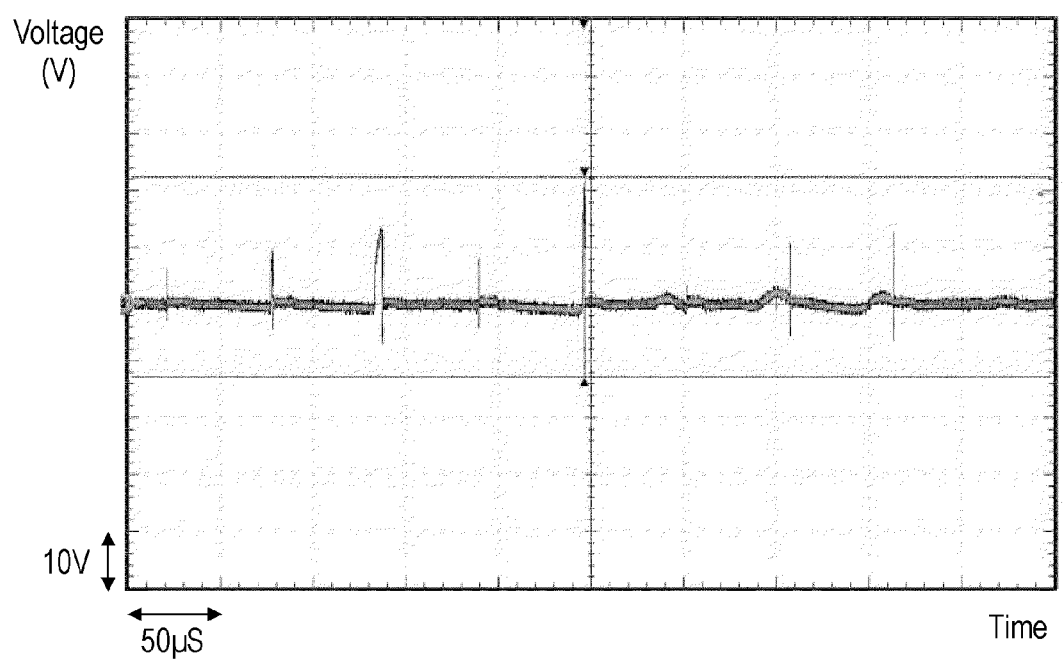
FIG. 8 is a diagram showing an example of a complete wave form collapse.
Figure 9:
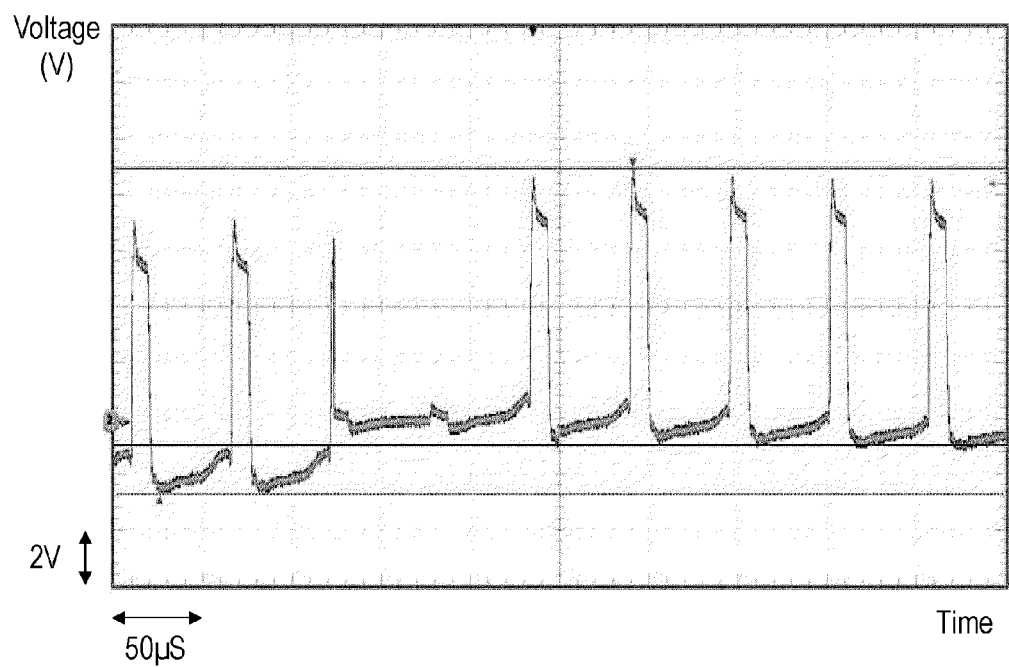
FIG. 9 is a diagram showing an example of a partial wave form collapse.
Figure 10:
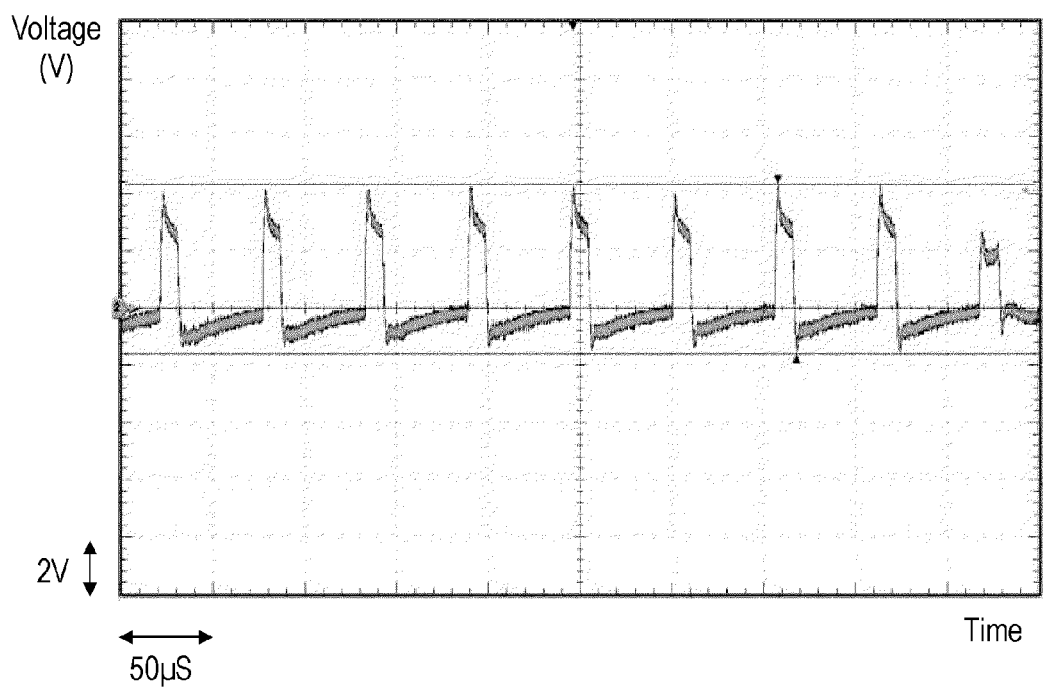
FIG. 10 is a diagram showing an example of none wave form collapse.

FIGS. 8 to 10 are drawings showing an example of the wave form collapse, FIG. 8 shows complete wave form collapse, FIG. 9 shows partial wave form collapse, and FIG. 10 shows no wave form collapse. In FIGS. 8 to 10, a measured time indicated by transverse axis is in the same scale of 50 µs/div. In addition, digital oscilloscope 130 is insulated by insulating transformer 140.

Furthermore, + side 120a of high voltage differential probe 120 is electrically connected to shaft 16 by making the conductor of the lead line in the form of a loop having a diameter of about 15 mm via lead line 110 having a length of about 30 cm and bringing the inner periphery thereof into conductive contact with the outer periphery of shaft 16. − side 120b of high voltage differential probe 120 is electrically connected to bracket 17 by bringing a front end of lead line 111 into contact with bracket 17 by use of conductive tape 112 via lead line 111 having a length of about 30 cm. With this configuration, the axial voltage which is the voltage between bracket 17 and shaft 16 was measured.

First Comparison Example

The axial voltage was measured in the same method as the first embodiment using the rotor having the same shape as FIG. 6 in which rotor steel core 31 is not insulated from shaft 16.

Table 1 shows the measurement results of the first embodiment and the first comparison example.

TABLE 1

|  |  |  | first comparison example none resin | first embodiment | | | | | | |
|---|---|---|---|---|---|---|---|---|---|---|
| resin thickness | | | (0 mm) | 0.2 mm | 0.5 mm | 0.75 mm | 1.0 mm | 2.0 mm | 2.5 mm | 3.5 mm |
| PBT resin | axial voltage wave form state | V | 35.2 complete wave form collapse | 9.9 partial wave form collapse | 7.9 partial wave form collapse | 6.2 none wave form collapse | 5.9 none wave form collapse | 2.7 none wave form collapse | 3.0 none wave form collapse | 3.1 none wave form collapse |
| SPS resin | axial voltage wave form state | V | — — | 8.4 partial wave form collapse | 5.9 none wave form collapse | 3.7 none wave form collapse | 3.4 none wave form collapse | 3.5 none wave form collapse | 3.5 none wave form collapse | 3.3 none wave form collapse |

As is apparent form the Table 1, by providing dielectric layer 50, the axial voltage can be lowered. In addition, if the axial voltage is equal to or less than 10 V, the number of the wave form collapses (insulating breakdown voltage of the oil film in the bearing) significantly decreases, whereby the effect of preventing the occurrence of electrolytic corrosion of the bearing can be further improved. Furthermore, as the insulating thickness is large, the axial voltage declines, and the wave form collapse is obviated in the region of 6.5 V or less, which makes it possible to suppress the occurrence of electrolytic corrosion of the bearing. Furthermore, by using the SPS resin in the insulating material, it is possible to lower the axial voltage in the same insulating thickness, compared to a case using the PBT resin.

Second Example

In the second embodiment, the measurement of the impedance was performed by the same brushless motor as the first embodiment.

In the measurement of the impedance, NF circuit design block LCR meter ZM2353 and test lead 2325A were used to measure the impedance of the power supply voltage Vdc between the lead line of the coil and shaft 16. In addition, in the non rotation state, the brushless motor orientation was shaft horizontal and the measurement conditions were a voltage of 1 V and frequency of 10 kHz.

Furthermore, in order to confirm the impedance state during driving, the axial potential during driving was measured.

Figure 11:
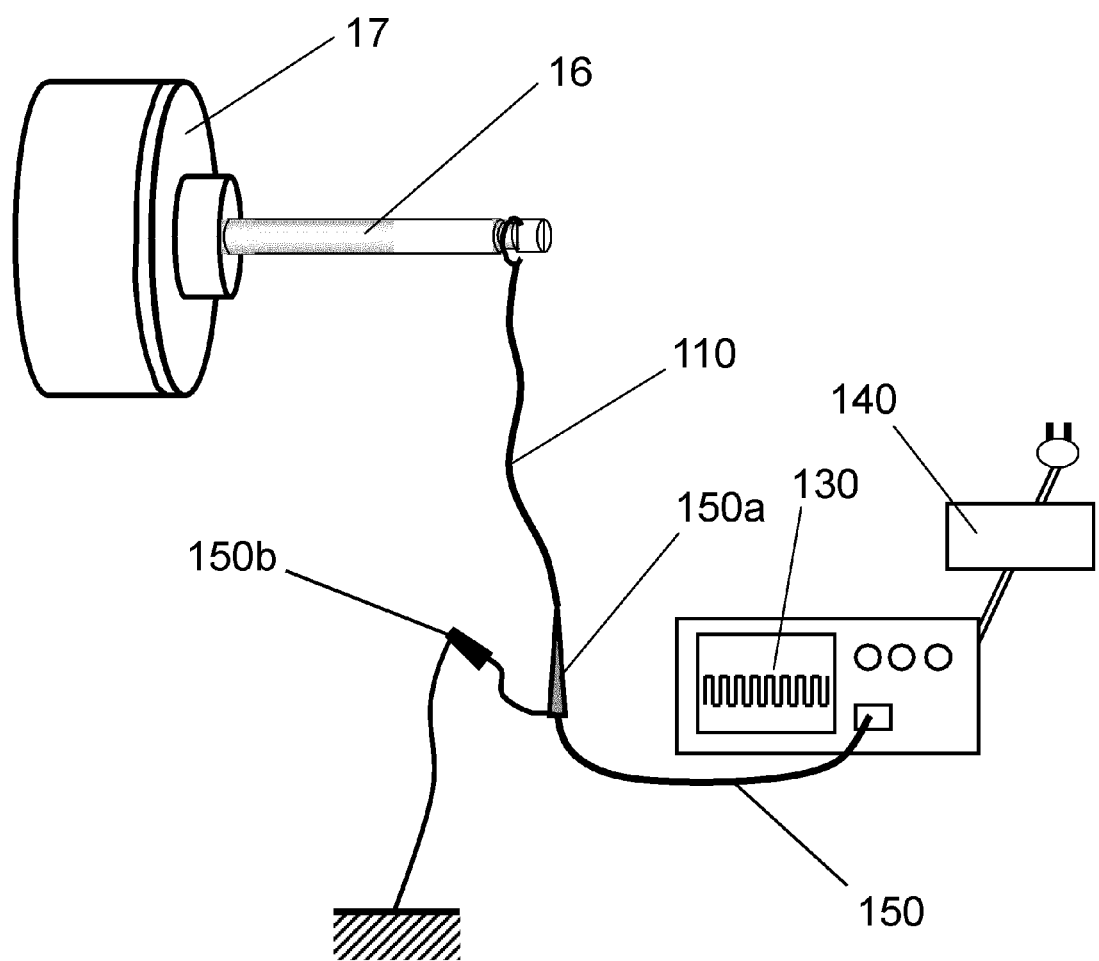
FIG. 11 is a diagram showing a measurement method of an axial potential of a second embodiment.

FIG. 11 shows a diagram of the measurement method of the axial potential of the second embodiment. The driving state and the driving condition were the same as the first embodiment, and the measurement of the axial voltage was performed so that a voltage wave form was observed by digital oscilloscope 130 (Techtronics DPO7104) and passive probe 150 (Techtronics P6139A), and the measurement voltage from peak to peak was set to the axial voltage.

The measured time indicated by transverse axis was in the same scale of 50 μs/div similarly to the first embodiment, and digital oscilloscope 130 was insulated by insulating transformer 140.

Furthermore, probe side 150a of passive probe 150 was electrically connected to shaft 16, by making the conductor of the lead line in the shape of a loop of a diameter of about 15 mm via lead line 110 having a length of about 30 cm, and by bringing the inner periphery thereof into conductive contract with the outer periphery of shaft 16. Ground side 150b of passive probe 150 was measured by being connected to the ground of the stabilized power supply used in the power supply of the power supply voltage Vdc of the coil. With this configuration, the axial potential, which is the potential between the ground of the power supply voltage Vdc of the coil and shaft 16, was measured.

Second Comparison Example

By use of the rotor of the same configuration as FIG. 6 in which rotor steel cores 31 is not insulated from shaft 16, the impedance and the axial potential were measured in the same manner as the second embodiment.

Table 2 shows the measurement results of the second embodiment and the second comparison example.

TABLE 2

|  |  |  | second comparison example | second embodiment | | | | | | |
|---|---|---|---|---|---|---|---|---|---|---|
| resin thickness | | | none resin | 0.2 mm | 0.5 mm | 0.75 mm | 1.0 mm | 2.0 mm | 2.5 mm | 3.5 mm |
| PBT resin | impedance | kΩ | 227 | 434 | 455 | 467 | 486 | 506 | 524 | 537 |
|  | axial potential | v | 170 | 121 | 114 | 112 | 110 | 106 | 104 | 102 |
| SPS resin | impedance | kΩ | — | 446 | 469 | 490 | 516 | 536 | 543 | 554 |
|  | axial potential | v | — | 117 | 112 | 108 | 108 | 102 | 102 | 100 |

As is apparent from the Table 2, by making the rotor of insulating configuration, the impedance of the rotor can be equal to or greater than 400 kΩ. Furthermore, impedance at the same thickness can be raised by making the PBT resin into an SPS resin. That is, in the case of the mold motor in which the stator steel core insulated by the resin and the stator coil are integrally molded by the insulating resin, the impedance between the ground and the bracket (stator side) is about 500 kΩ. Thus, by setting the impedance between the ground and the shaft to 400 kΩ or more, the axial voltage can be lowered so as to approximate the impedance between the ground and the bracket (stator side).

In the same manner as the impedance, the axial potential can be lowered by making the rotor of insulating configuration. Furthermore, by making the PBT resin into the SPS resin, the axial potential at the same thickness can be lowered.

Third Example

In the measurement of the first embodiment, + side 120a of differential probe 120 is connected to shaft 16 (bearing inner ring) and − side 120b thereof is connected to bracket 17 (bearing outer ring). From the fact that the voltage wave form peaks described in FIGS. 8 to 10 point upward, it is understood that the potential of shaft 16 (bearing inner ring) side is higher than that of bracket 17 (berating outer ring). Thus, it is determined that the current flows from the bearing inner ring side to the bearing outer ring side.

Figure 12:
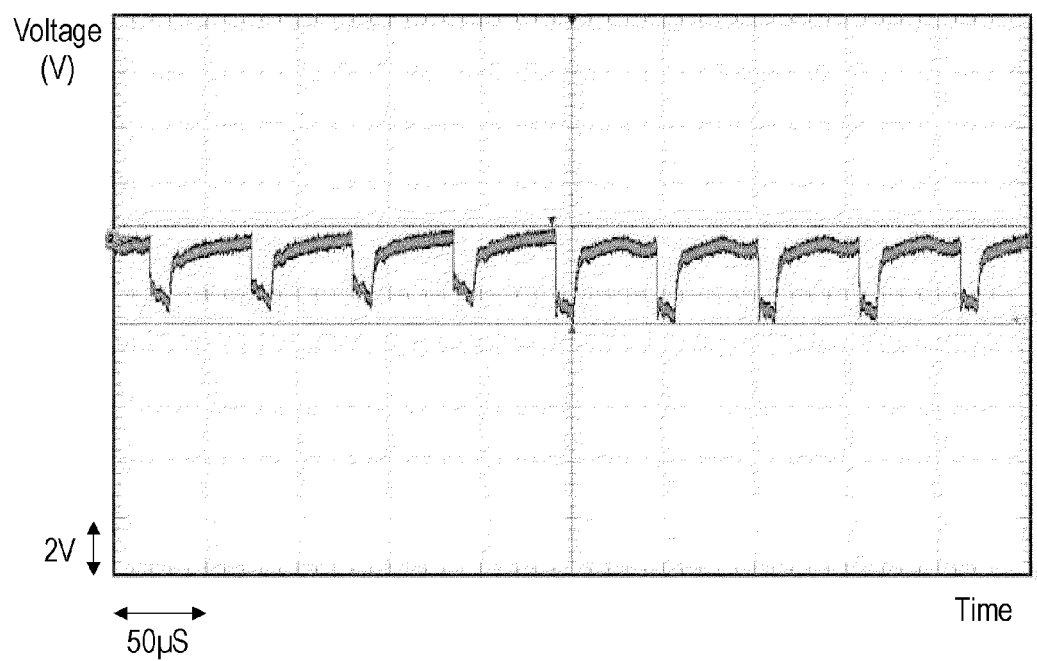
FIG. 12 is a diagram showing a wave form of the axial voltage when insulating resin thickness is large.

FIG. 12 is a drawing showing the wave form of the axial voltage when the resin thickness of the insulation is large. As shown in FIG. 12, by increasing the resin thickness of the insulation, the wave form peaks of the axial voltage point downward, that is, changed to the opposite direction of the case of FIGS. 8 to 10. When the wave form peaks of the axial voltage points downward, it can be determined that the current flows from the bearing outer ring side to the bearing inner ring. It is determined that the change in direction of the In addition, the electrolytic corrosion endurance test was carried out under the no load condition in which the power supply voltage Vdc of the coil was 391 V, the power supply voltage Vcc of the control circuit was 15 V, the control voltage Vsp was 3 V, the rpm was 1000 r/min, the brushless motor orientation was shaft horizontal, and the environmental temperature was 10° C.

Furthermore, in order to accelerate electrolytic corrosion further than the normal, a special bearing, in which only one of the seven steel balls of the bearing was a steel ball and the rest were ceramic balls, was attached to the output shaft side (the substrate side). The bearing of the ceramic ball specifications was attached to the opposite output shaft side (mold resin side) to make a state of complete insulation.

Moreover, in the determination of electrolytic corrosion the electrolytic corrosion life is the period up to when an auditory abnormality and the wave form abrasion of the inner part of the bearing were confirmed.

Third Comparison Example

The rotor of the same shape as FIG. 6 in which stator steel core 31 is not insulated from shaft 16 was used to carry out the confirmation of the current direction and the electrolytic corrosion endurance test in the same method as the third embodiment.

Table 3 shows the measurement results of the third embodiment and the third comparison example.

TABLE 3

| | | | third comparison example none resin | third embodiment | | | | | | |
|---|---|---|---|---|---|---|---|---|---|---|
| resin thickness | | | (0 mm) | 0.2 mm | 0.5 mm | 0.75 mm | 1.0 mm | 2.0 mm | 2.5 mm | 3.5 mm |
| PBT resin | axial voltage | V | 35.2 | 9.9 | 7.9 | 6.2 | 5.9 | 2.7 | 3.0 | 3.1 |
| | direction of the axial voltage wave form | | upward | upward | upward | upward | upward | upward | downward | downward |
| | direction of current | | | inner ring → outer ring | inner ring → outer ring | inner ring → outer ring | inner ring → outer ring | inner ring → outer ring | outer ring → inner ring | outer ring → inner ring |
| | impedance | kΩ | 227 | 434 | 455 | 467 | 486 | 506 | 524 | 537 |
| | electrolytic corrosion endurance test result | h | ≤500 | 1000-1500 | — | — | 1500-2000 | 1500-2000 | 2000≤ | — |
| SPS resin | axial voltage | V | — | 8.4 | 5.9 | 3.7 | 3.4 | 3.5 | 3.5 | 3.3 |
| | direction of the axial voltage wave form | | — | upward | upward | upward | upward | downward | downward | downward |
| | direction of current | | — | inner ring → outer ring | inner ring → outer ring | inner ring → outer ring | inner ring → outer ring | outer ring → inner ring | outer ring → inner ring | outer ring → inner ring |
| | impedance | kΩ | — | 446 | 469 | 490 | 516 | 536 | 543 | 554 |
| | electrolytic corrosion endurance test result | h | — | 1000-1500 | — | — | 1500-2000 | 2000≤ | 2000≤ | — | voltage wave form is resulted from the impedance of rotor 14 side being higher than the impedance of stator 10 side due to increasing the insulation thickness of rotor 14.

Furthermore, in order to confirm electrolytic corrosion prevention effect in the insulation specifications, the brushless motors of the same specifications of the insulation thickness of 0.2 mm, 1.0 mm, 2.0 mm, and 2.5 mm were prepared, whereby the effect of electrolytic corrosion suppression was confirmed by an electrolytic corrosion endurance test.

As is apparent from the results of Table 3, by making the rotor of insulation configuration and the axial voltage equal to or less than 10 V, the electrolytic corrosion life can be two or three times longer than the related art. In addition, by making the axial voltage equal to or less than 6.5 V to obviate the wave form collapse, the electrolytic corrosion life can be two or three times longer than that of the related art.

In addition, by making the impedance between the power supply lead line and the shaft equal to or greater than 520 kΩ, the impedance of the rotor side becomes higher than that of the stator side, whereby, by changing the direction of the current from the bearing outer ring to the bearing inner ring, electrolytic corrosion life can be four or more times longer. That is, in the case of the molded motor in which the stator steel core insulated by the resin and the stator coil are integrally molded by the insulating resin, the impedance between the ground and the bracket (the stator side) is about 500 kΩ. Thus, since, by making the impedance between the ground and the shaft (rotor side) equal to or greater than 520 kΩ, the impedance between the ground and the shaft (rotor side) becomes higher than that between the ground and the bracket (stator side), the current can flow from the bearing outer ring to the bearing inner ring.

Fourth Example

In a fourth embodiment, the rotating body of the configuration as shown in FIG. 3 and the rotating body of the configuration as shown in FIG. 4 were used as the same stator used in the first embodiment, respectively to measure the axial voltage by the same method as the first embodiment. Furthermore, the impedance and the axial potential were measure by the same method as the second embodiment.

Furthermore, the PBT resin was used for the insulating material forming dielectric layer 50. The minimum thickness of the resin was 2.5 mm, and the protrusion for preventing the revolution was provided in outer steel core 31a and inner steel core 31b, respectively.

Fourth Comparison Example

The measurement result of the axial voltage, the impedance and the axial potential of the 2.5 mm thickness insulation specifications of the PBT resin produced in the first embodiment were set to the comparison example.

Table 4 shows the measurement results of the fourth embodiment and the fourth comparison example.

also be reduced, which is excellent in the prevention of the occurrence of the bearing electrolytic corrosion of the electric motor Second Exemplary Embodiment In the present embodiment, a configuration of an indoor air conditioner as electric machinery in the present invention will be described.

Figure 13:
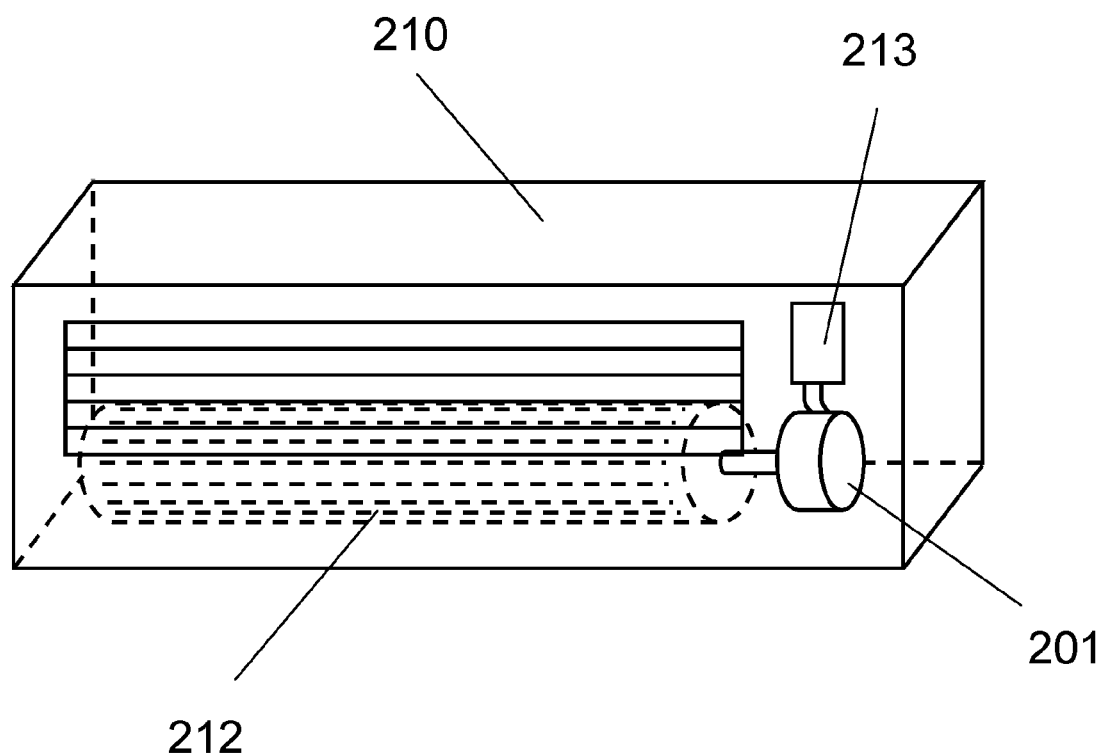
FIG. 13 is a schematic diagram showing a configuration of an indoor air conditioner as an example of electric machinery in the second embodiment of the present invention.

FIG. 13 is a schematic diagram of an indoor air conditioner as electric machinery in the second embodiment of the present invention.

In FIG. 13, brushless motor 201 is loaded in a case of indoor air conditioner 210. Cross flow fan 212 is mounted on a rotation shaft of brushless motor 201. Brushless motor 201 is driven by motor drive apparatus 213. By the electric current application from motor drive apparatus 213, brushless motor 213 rotates, and cross flow fan 212 rotates accordingly. By the rotation of cross flow fan 212, the air, which has been subjected to air conditioning by a heat exchanger (not shown) as an indoor machine, is sent indoors. Herein, as brushless motor 201, for example, the electric motor shown in the above-mentioned embodiment can be applied.

The electric machinery of the present invention includes the brushless motor and the case with the brushless motor loaded thereon, the electric motor of the present invention is adopted as the brushless motor.

In the description as mentioned above, as the embodiment of the electric machinery relating to the present invention, the brushless motor loaded on the indoor air conditioner was adopted. However, it is needless to say that the present invention can be applied to electric motors loaded on the other electric machineries, for example, a brushless motor used on various home machinery, a brushless motor loaded on various information machines, and a brushless motor used in industrial machinery.

As described above, the electric motor of the present invention includes the stator having the stator steel cores around which the coil is wound; the rotor which includes a rotating

TABLE 4

| | | fourth comparison example | fourth embodiment | |
| --- | --- | --- | --- | --- |
| | resin thickness | shaft insulation 2.5 mm | division steel core insulation 2.5 mm | division steel core insulation + gap 2.5 mm |
| PBT resin | axial voltage V | 3.0 | 3.3 | 3.5 |
| | wave form state | none wave form collapse | none wave form collapse | none wave form collapse |
| | impedance KΩ | 524 | 522 | 537 |
| | axial potential | 104 | 104 | 102 |

As is apparent from the result of Table 4, even if the shaft insulation as shown in FIG. 5 is changed to the division steel core insulation as shown in FIG. 2, the axial voltages, the impedances and the axial potentials can respectively be made equal by making the steel core into a shape that does not increase the electrode area.

Furthermore, by providing the hole portion such as gap 40, the impedance is raised, whereby the axial potential can be reduced.

As is apparent from this result, the electric motor of the present invention has an effect in which the axial voltage is reduced compared to the electric motor of the related art, so that the impedance can be raised and the axial potential can body that holds a plurality of permanent magnets in the circumferential direction to face the stator and a shaft that fastens the rotating body so as to penetrate the center of the rotating body; a bearing for supporting the shaft; and a bracket for fixing the bearing, and has a configuration in which a dielectric layer is provided between the shaft and an outer periphery of the rotating body. For this reason, via the dielectric layer provided between the shaft and the outer periphery of the rotating body, there is provided a configuration in which the electrostatic capacity by the dielectric layer is equivalently connected in series in the low impedance stator, which makes it possible to raise the impedance of the rotor side. As a result, it is possible to approximate the impedance of the bearing inner ring side to that of the bearing ring outer ring side. Thus, it is possible to hold the balance of high frequency potentials of the bearing inner ring side and the bearing outer ring side, whereby it is possible to prevent the occurrence of electrolytic corrosion bearing generated by high frequency due to PMW or the like. Thus, according to the electric motor of the present invention, it is possible to provide an electric motor which prevents the occurrence of electrolytic corrosion in the bearing. Furthermore, by building the electric motor of the present invention into an electric machinery, it is possible to provide an electric machinery including an electric motor which prevents the occurrence of electrolytic corrosion in the bearing.

In addition, although the example of the shape shown in FIGS. 2 to 5 as the shape of the dielectric layer has been described in the first embodiment, other shapes may be used, and the impedance of the rotor may be raised by the electrostatic capacity of the dielectric layer.

Furthermore, although the example of the inner rotor type electric motor, in which the rotor is disposed rotatably at the inner periphery side of the stator, has been described, the same effect can be achieved even by providing the dielectric layer as mentioned above in an outer rotor type in which the rotor is disposed at the outer periphery side of the stator, and a twin rotor type electric motor in which the rotors are disposed at the both side of the inner periphery and the outer periphery.

INDUSTRIAL APPLICABILITY

The electric motor of the present invention can reduce the axial voltage and is optimal for preventing the occurrence of electrolytic corrosion of the bearing. For this reason, it is effective for the electric machinery in which the low cost and the high life of the electric motor are further required, for example, the electric motor loaded on an indoor air conditioner, an outdoor air conditioner, a water heater, an air cleaner or the like.

The invention claimed is:

1. An electric motor comprising:
   a stator including a stator steel core around which a coil is wound wherein the stator steel core is molded with a mold material;
   a rotor which includes a rotating body that faces the stator, and a shaft that fastens to the rotating body so as to penetrate the center of the rotating body;
   a bearing having steel balls for supporting the shaft so that the rotor freely rotates; and
   a bracket for fixing the bearing,
   wherein a dielectric layer is provided between an inner periphery and an outer periphery of the rotating body, the dielectric layer being configured and made of a selected material to approximate an impedance of a rotor side with an impedance of a stator side.

2. The electric motor of claim 1, wherein the dielectric layer is an insulating material for electrolytic corrosion prevention.

3. The electric motor of claim 1, wherein the dielectric layer is an insulating resin.

4. The electric motor of claim 3, wherein the insulating resin is a syndiotactic polystyrene resin.

5. The electric motor of claim 1, wherein the dielectric layer is provided so as to surround the shaft.

6. The electric motor of claim 1, wherein the rotating body has an outer steel core constituting the outer periphery, an inner steel core constituting the inner periphery fastened to the shaft, and the dielectric layer, and
   wherein the outer steel core and the inner steel core are fixed to each other via the dielectric layer.

7. The electric motor of claim 1, wherein the dielectric layer is disposed so as to insulate and separate the inner periphery from the outer periphery of the rotating body thereof.

8. The electric motor of claim 1, wherein the dielectric layer includes a hole portion.

9. The electric motor of claim 1, wherein the dielectric layer has a shape in which a plurality of types of arcs with different diameter direction widths are combined.

10. The electric motor of claim 1, wherein the rotor is disposed rotatably in an inner periphery side of the stator.

11. The electric motor of claim 1, wherein the dielectric layer is provided so that an impedance between the stator steel core and the shaft is raised.

12. The electric motor of claim 1, wherein a potential difference between an outer ring and an inner ring of the bearing when being driven is equal to or less than 10V.

13. The electric motor of claim 1, wherein an impedance between a ground and the shaft is equal to or greater than 400 kΩ.

14. The electric motor of claim 1, wherein an impedance between a ground and the shaft is equal to or greater than 520 kΩ.

15. Electric machinery loaded with the electric motor according to claim 1.

* * * * *